(12) United States Patent
Akaza et al.

(10) Patent No.: US 8,538,634 B2
(45) Date of Patent: Sep. 17, 2013

(54) BODY VELOCITY ESTIMATING DEVICE, AND COLLISION SAFETY PROTECTING SYSTEM

(75) Inventors: Mitsuaki Akaza, Tokyo (JP); Toshiyuki Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 212 days.

(21) Appl. No.: 13/263,920

(22) PCT Filed: Jul. 2, 2009

(86) PCT No.: PCT/JP2009/003075
§ 371 (c)(1),
(2), (4) Date: Oct. 11, 2011

(87) PCT Pub. No.: WO2011/001473
PCT Pub. Date: Jan. 6, 2011

(65) Prior Publication Data
US 2012/0035812 A1 Feb. 9, 2012

(51) Int. Cl.
*B60R 21/0136* (2006.01)
*G06F 7/00* (2006.01)

(52) U.S. Cl.
USPC ............................................. 701/46; 701/301

(58) Field of Classification Search
USPC .............. 701/46, 70, 79, 300, 301; 73/865.8, 73/1.38; 280/5.51
See application file for complete search history.

(56) References Cited

U.S. PATENT DOCUMENTS

| 5,099,443 A | 3/1992 | Higashimata et al. |
| 6,052,642 A | 4/2000 | Wagner et al. |
| 2005/0216164 A1* | 9/2005 | Sakata ............................ 701/70 |
| 2007/0100546 A1* | 5/2007 | Ring ............................ 701/213 |

FOREIGN PATENT DOCUMENTS

| DE | 19638278 A1 | 3/1998 |
| DE | 10 2006 010 477 A1 | 9/2007 |
| JP | 2588219 B2 | 3/1997 |
| JP | 2699735 B2 | 1/1998 |

* cited by examiner

*Primary Examiner* — Tan Q Nguyen
(74) *Attorney, Agent, or Firm* — Birch, Stewart, Kolasch & Birch, LLP

(57) ABSTRACT

Body velocity estimating device 10A is constituted by acceleration measurement unit 11, acceleration separation unit 12, filter processing operation unit 13, acceleration addition unit 14, integration processing operation unit 15, and estimated body velocity output unit 16. The unit 12 compares an acceleration measured by the unit 11 with set acceleration upper and lower limit reference values to separate the measured acceleration into reference value range-in and range-out accelerations. The unit 13 performs filtering on the separated reference value range-out acceleration to calculate filtered accelerations of the reference value range-out acceleration. The unit 14 adds the filtered accelerations to the previously separated range-in acceleration. The unit 15 multiplies the added acceleration by an operation period, and adds the resultant to the estimated body velocity calculated in the preceding one operation period to update the value of the estimated body velocity. The unit 16 outputs the updated estimated body velocity.

7 Claims, 13 Drawing Sheets

(a)

(b)

(a)

(b)

BODY VELOCITY ESTIMATING DEVICE, AND COLLISION SAFETY PROTECTING SYSTEM

TECHNICAL FIELD

The present invention relates to a body velocity estimating device for estimating a body velocity by calculating the body velocity repeatedly at a fixed operation period interval, and a collision safety protecting system that performs deployment control on a passenger protecting device or a pedestrian protecting device on the basis of the body velocity estimated by the body velocity estimating device.

BACKGROUND ART

An airbag system is known as an example of a passenger protecting device, and a pop-up hood system is known as an example of a pedestrian protecting device.

An airbag system that performs deployment control on an airbag during a collision is constituted by an airbag control ECU (Electronic Control Unit) disposed in a substantially central portion of a vehicle, and an airbag for protecting a passenger during a head-on collision. Other airbags include a side airbag or a curtain airbag for protecting the passenger during a side-on collision, and so on.

Meanwhile, a pop-up hood system for performing deployment control on a pop-up hood during a collision with a pedestrian includes a pedestrian protection control ECU disposed in the substantially central portion of the vehicle, and a pop-up hood for mitigating an impact on the pedestrian during the collision with the pedestrian. Other mechanisms for protecting pedestrians include a pedestrian protecting airbag, an airbag for preventing a pedestrian from rolling on a body, and so on.

Incidentally, a body velocity may be used as an activation condition in the passenger protecting device and pedestrian protecting device described above.

When calculating the body velocity, a wheel velocity substantially matches the body velocity during a normal run, but when a tire spins, locks, or the like, a difference occurs between the wheel velocity and the body velocity, and therefore the wheel velocity must be corrected in order to calculate the body velocity accurately.

Patent Document 1, for example, discloses a known method of estimating a body velocity by correcting a wheel velocity, in which an acceleration measured by an calculation from a wheel velocity is corrected downward when the acceleration exceeds a predetermined upper limit value (or lower limit value), and a value obtained by integrating the corrected acceleration is output as a corrected wheel velocity (=the body velocity).

PRIOR ART DOCUMENTS

Patent Documents

Patent Document 1: Japanese Patent No. 2,588,219 (Japanese Patent Application Publication No. H01-132968)

A graph in FIG. 13 shows a problem that arises when the body velocity is estimated by correcting the acceleration downward on the basis of the technique disclosed in Patent Document 1. Here, a method of measuring the acceleration by implementing differentiation processing on the wheel velocity and estimating the body velocity by implementing integration processing on the acceleration is shown on a temporal axis. A gradient of the wheel velocity differs depending on whether the difference between the wheel velocity and the body velocity, which is generated when rapid velocity variation such as spinning and locking occurs during a vehicle run, decreases or increases. Therefore, although no problems arise when downward correction amounts of the acceleration match between a positive region and a negative region, as shown in FIG. 13(a), the corrected estimated body velocity diverges from a true body velocity when the downward correction amounts of the acceleration do not match between the positive region and the negative region, as shown in FIG. 13(b).

Note that in FIG. 13, a thick solid line and a thin solid line following the integration processing indicate the estimated body velocity and the corrected estimated body velocity, respectively.

A method of suppressing rapid velocity variation using a low pass filter (LPF) may be employed as a simple method of avoiding this divergence.

However, when a conventional method using an LPF is employed, a deviation caused by a delay occurs immediately after rapid variation in the body velocity due to spinning, locking, or the like, as shown by a graph in FIG. 14, and even during the normal travel in which spinning and locking do not occur, a delay arises with respect to the velocity variation, as shown by a graph in FIG. 15. Note that in FIG. 14, a thick solid line indicates the wheel velocity and the body velocity and a dotted line indicates the estimated body velocity following passage through the LPF. Further, in FIG. 15, a thick solid line indicates the wheel velocity (=body velocity) and a dotted line indicates the estimated body velocity following passage through the LPF.

The present invention has been designed to solve the problems described above, and an object thereof is to provide a body velocity estimating device and a collision safety protecting system with which variation in an estimated body velocity due to rapid variation in a body velocity is suppressed, and a delay with respect to velocity variation during a normal run is avoided.

SUMMARY OF THE INVENTION

A body velocity estimating device of the invention, which estimates a body velocity by calculating the body velocity repeatedly at a fixed operation period and outputs the estimated body velocity, includes: an acceleration measurement unit that measures an acceleration of the body; an acceleration separation unit that compares the acceleration measured by the acceleration measurement unit with set acceleration upper and lower limit reference values, and separates the measured acceleration into a reference value range-in acceleration within a range of the upper and lower limit reference values and a reference value range-out acceleration outside the range of the upper and lower limit reference values; a filter processing operation unit that performs filtering on the reference value range-out acceleration separated by the acceleration separation unit to calculate a filtered acceleration of the reference value range-out acceleration; an acceleration addition unit that adds the filtered acceleration to the reference value range-in acceleration separated by the reference value range in/out acceleration separation unit; an integration processing operation unit that multiplies the acceleration added by the acceleration addition unit by the operation period, and updates a value of the estimated body velocity by adding the resultant to an estimated body velocity calculated in the preceding one operation period; and an estimated body velocity output unit that outputs the estimated body velocity updated by the integration processing operation unit.

According to the invention, the acceleration separation unit compares the acceleration measured by the acceleration measurement unit with the set acceleration upper and lower limit reference values and separates the measured acceleration into the reference value range-in acceleration and the reference value range-out acceleration, the filter processing operation unit performs filtering on the separated reference value range-out acceleration to calculate a filtered acceleration of the reference value range-out acceleration, the acceleration addition unit adds the filtered acceleration to the previously separated reference value range-in acceleration, the integration processing unit multiplies the added acceleration by the operation period and updates the value of the estimated body velocity by adding the resultant to the estimated body velocity calculated in the preceding one operation period, and the estimated body velocity output unit outputs the updated estimated body velocity. Hence, a body velocity estimating device capable of suppressing variation in the estimated body velocity due to rapid variation in the body velocity and avoiding a delay with respect to velocity variation during a normal run can be provided.

Further, a collision safety protecting system of the invention, which detects a collision with an object or a person and performs deployment control on a passenger protecting device or a pedestrian protecting device provided in a body, includes: a body velocity estimating device having an acceleration measurement unit that measures an acceleration of the body, an acceleration separation unit that compares the acceleration measured by the acceleration measurement unit with set acceleration upper and lower limit reference values and separates the measured acceleration into a reference value range-in acceleration in a region within a range of the upper and lower limit reference values and a reference value range-out acceleration in a region outside the range of the upper and lower limit reference values, a filter processing operation unit that performs filtering on the reference value range-out acceleration separated by the acceleration separation unit to calculate a filtered acceleration of the reference value range-out acceleration, an acceleration addition unit that adds the filtered acceleration to the reference value range-in acceleration separated by the acceleration separation unit, an integration processing operation unit that multiplies the acceleration added by the acceleration addition unit by the operation period, and updates a value of the estimated body velocity by adding the resultant to an estimated body velocity calculated in the preceding one operation period, and an estimated body velocity output unit that outputs the estimated body velocity updated by the integration processing operation unit; a collision determination unit that detects an impact on the object or the person and performs a collision determination on the body through calculation; and a protecting device deployment control unit that performs a threshold determination on the estimated body velocity output from the body velocity estimating device, and drives the passenger protecting device or the pedestrian protecting device when the estimated body velocity is within a preset upper/lower limit driving threshold range of the passenger protecting device or the pedestrian protecting device and the collision determination unit determines that driving is required.

According to the invention, the collision determination unit detects an impact on the object or the person and performs a collision determination on the body through calculation, and the protecting device deployment control unit performs a threshold determination on the estimated body velocity output from the body velocity estimating device and drives the passenger protecting device or the pedestrian protecting device when the estimated body velocity is within the preset upper/lower limit driving threshold range of the passenger protecting device or the pedestrian protecting device and the collision determination unit determines that driving is required. It is therefore possible to provide a collision safety protecting system with which an estimated body velocity calculated by a body velocity estimating device that is capable of suppressing variation in the estimated body velocity due to rapid variation in the body velocity and avoiding a delay with respect to velocity variation during the normal run can be used as an operation condition of the passenger protecting device or the pedestrian protecting device, and erroneous activation can be prevented even when a wheel velocity indicates an abnormal value due to locking, spinning, or the like.

BEST MODE FOR CARRYING OUT THE INVENTION

Embodiments of the present invention will now be described with reference to the accompanying drawings in order to explain the present invention in more detail.

Embodiment 1

Figure 1:
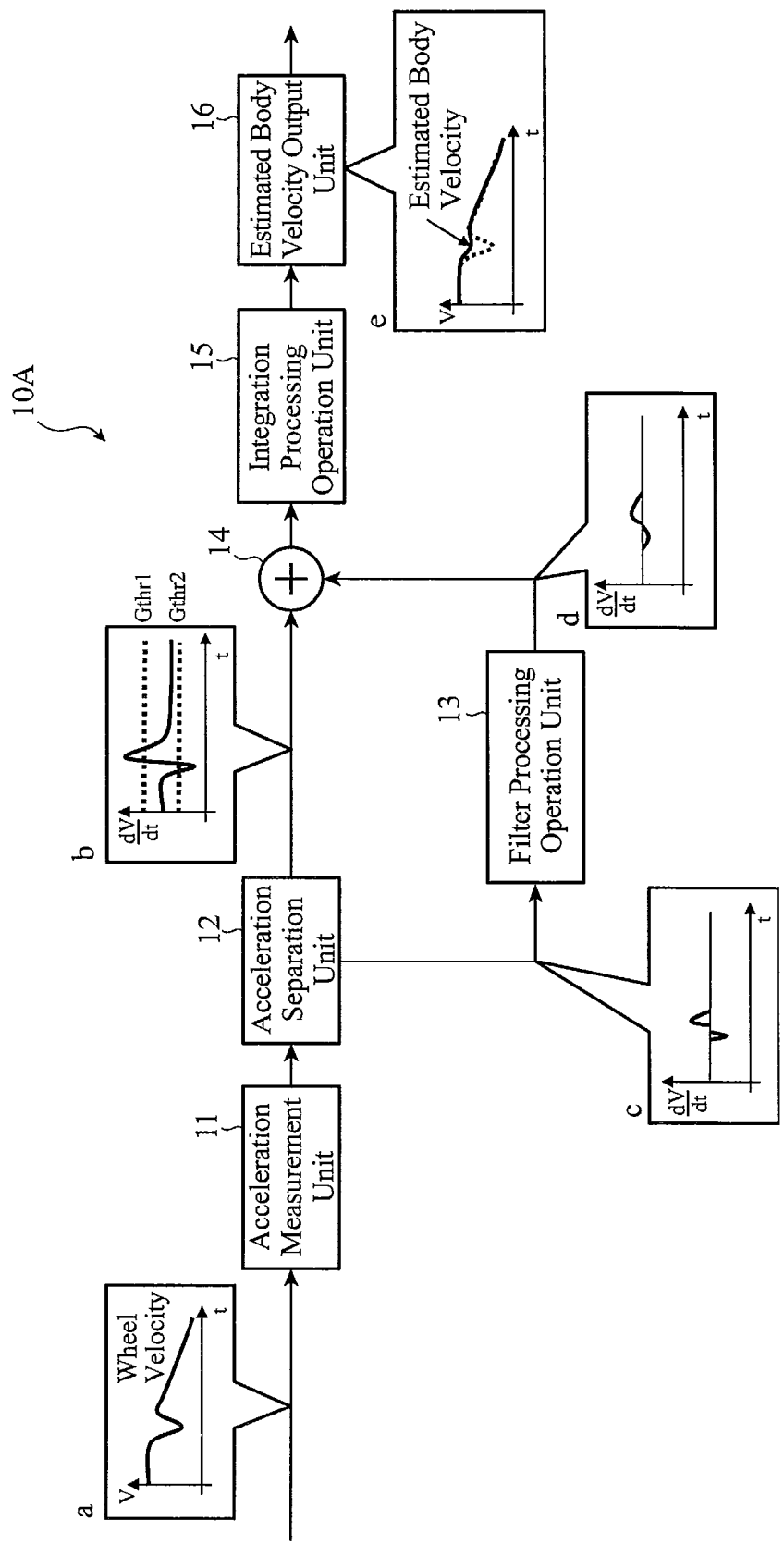
FIG. 1 is a block diagram showing the constitution of a body velocity estimating device of Embodiment 1 in the present invention.

A body velocity estimating device of Embodiment 1 in the present invention will be described with reference to FIGS. 1 to 4. FIG. 1 is a block diagram showing the constitution of a body velocity estimating device 10A of Embodiment 1 in the present invention. In order to aid understanding of the following description, boxes in FIG. 1 show output waveforms of respective constitutional blocks of the body velocity estimating device 10A in time series. Note that the content of the boxes will be detailed when describing operations.

As shown in FIG. 1, the body velocity estimating device 10A of Embodiment 1 in the invention is constituted by an acceleration measurement unit 11, an acceleration separation unit 12, a filter processing operation unit 13, an acceleration addition unit 14, an integration processing operation unit 15, and an estimated body velocity output unit 16.

The body velocity estimating device 10A having this constitution is implemented on an ECU of a vehicle, or more specifically, implemented on a CPU (Central Processing Unit) or a DSP (Digital Signal Processor) built into the ECU.

The acceleration measurement unit 11 implements differentiation processing on an output of a wheel velocity sensor (not depicted) provided in a body, and outputs a processing result to the acceleration separation unit 12.

The acceleration separation unit 12 compares the acceleration measured by the acceleration measurement unit 11 with preset acceleration upper and lower limit reference values to separate the measured acceleration into a reference value range-in acceleration within a range of the upper and lower limit reference values and a reference value range-out acceleration outside the range of the upper and lower limit reference values, then outputs the reference value range-out acceleration to the filter processing operation unit 13 and outputs the reference value range-in acceleration to one input terminal of the acceleration addition unit 14.

The filter processing operation unit 13 performs filtering on the reference value range-out acceleration separated by the acceleration separation unit 12 to calculate a filtered acceleration of the reference value range-out acceleration, and outputs the calculated filtered acceleration to another terminal of the acceleration addition unit 14.

The acceleration addition unit 14 adds the filtered acceleration output by the filter processing operation unit 13 to the reference value range-in acceleration separated by the acceleration separation unit 12, and outputs the resultant to the integration processing operation unit 15.

The integration processing operation unit 15 multiplies the acceleration added by the acceleration addition unit 14 by an operation period, adds the resultant to an estimated body velocity calculated in the preceding one operation period in order to update the value of the estimated body velocity, and outputs the updated estimated body velocity to the estimated body velocity output unit 16.

The estimated body velocity output unit 16 outputs the estimated body velocity updated by the integration processing operation unit 15 to an externally connected passenger protecting device or pedestrian protecting device, for example.

Figure 2:
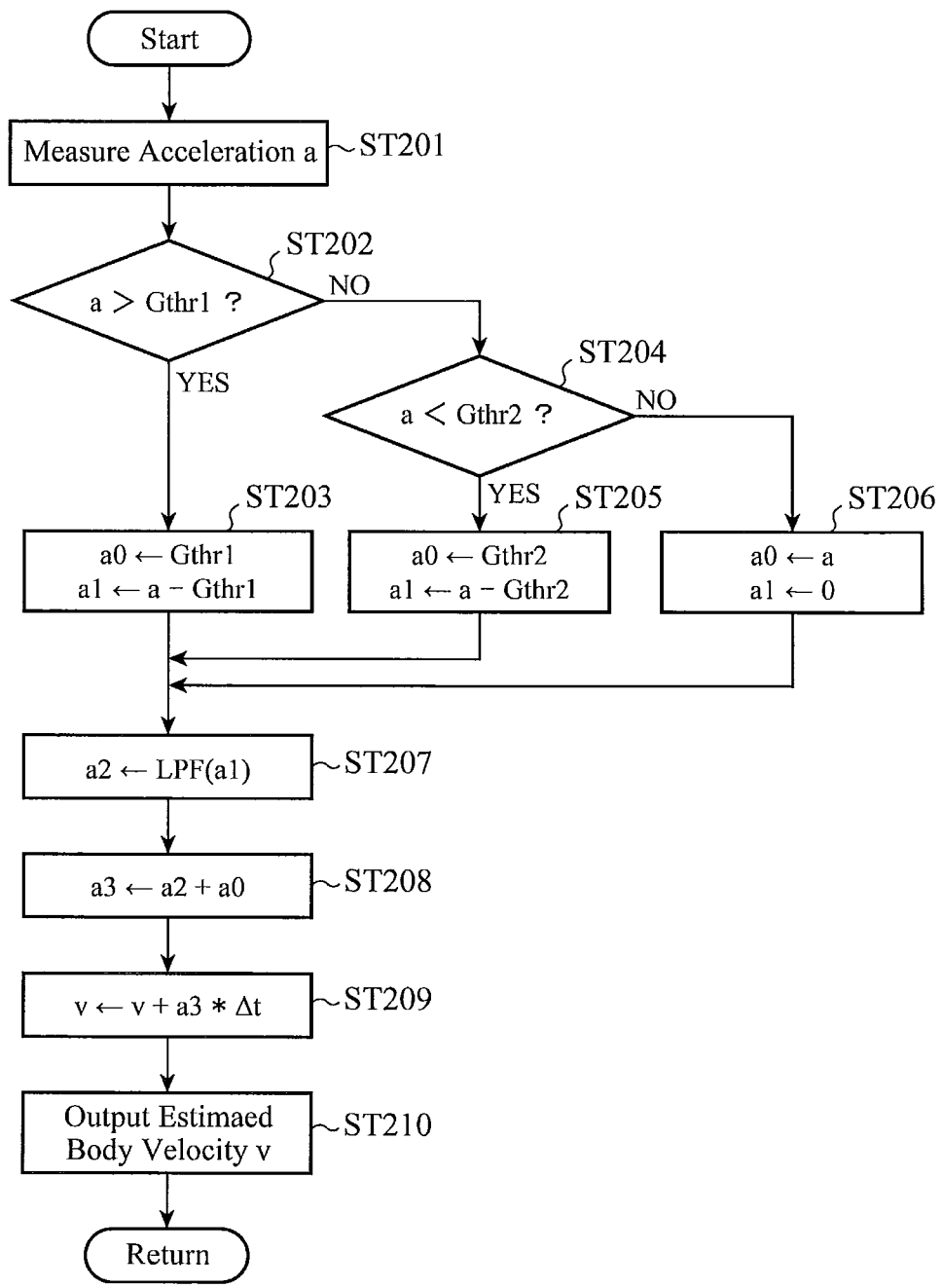
FIG. 2 is a flowchart showing an operation of the body velocity estimating device of Embodiment 1 in the invention.

FIG. 2 is a flowchart showing an operation of the body velocity estimating device 10A of Embodiment 1 in the invention.

Hereinafter, a body velocity estimation processing operation performed by the body velocity estimating device 10A of Embodiment 1 in the invention shown in FIG. 1 will be described in detail with reference to the flowchart shown in FIG. 2.

First, the acceleration measurement unit 11 measures an acceleration a by implementing differentiation processing on the output of the wheel velocity sensor, and outputs the measured acceleration a to the acceleration separation unit 12 (step ST201). A time series of the wheel velocity input into the acceleration measurement unit 11 is shown in a box a of FIG. 1. Upon reception of the measured acceleration a, the acceleration separation unit 12 compares the measured acceleration a with a preset upper limit reference value Gthr1 (step ST202). Levels indicated by dotted lines in a box b of FIG. 1 denote upper and lower limit reference values Gthr1, Gthr2 relating to a differential value (dV/dt) of the wheel velocity.

When the acceleration a measured by the acceleration measurement unit 11 is the upper limit reference value Gthr1 or more ("YES" in step ST202), the acceleration separation unit 12 sets the upper limit reference value Gthr1 in a storage area (a register a0) that can be referenced by the acceleration separation unit 12, and sets a value obtained by subtracting the upper limit reference value Gthr1 from the measured acceleration a in a register a1 (step ST203).

On the other hand, when the acceleration a measured by the acceleration measurement unit 11 is not the upper limit reference value Gthr1 or more ("NO" in step ST202), the acceleration separation unit 12 compares the acceleration a to the lower limit reference value Gthr2 (step ST204).

At this point, when the acceleration a is the lower limit reference value Gthr2 or less ("YES" in step ST204), the acceleration separation unit 12 sets the lower limit reference value Gthr2 in the register a0 and sets a value obtained by subtracting the lower limit reference value Gthr2 from the measured acceleration a in the register a1 (step ST205). Further, when the acceleration a is not the lower limit reference value Gthr2 or less ("NO" in step ST204), the acceleration separation unit 12 sets the measured acceleration a in the register a0 and sets a value "0" in the register a1 (step ST206).

In other words, by executing the processing of steps ST202 to ST206, the acceleration separation unit 12 compares the measured acceleration a with the preset acceleration upper and lower limit reference values Gthr1, Gthr2 in order to separate the measured acceleration a into a reference value range-in acceleration a0 within a range of the upper and lower limit reference values and a reference value range-out acceleration a1 outside the range of the upper and lower limit reference values.

Subsequently, the filter processing operation unit 13 calculates a filtered acceleration a2 by applying an LPF to the upper/lower limit reference value range-out acceleration a1 output by the acceleration separation unit 12 (step ST207). The time series of the upper/lower limit reference value range-out acceleration a1 before and after passage through the LPF are shown respectively in boxes c and d of FIG. 1.

Subsequently, the acceleration addition unit 14 calculates a total acceleration value a3 by adding the LPF-passed acceleration a2 calculated by the filter processing operation unit 13 to the upper/lower limit reference value range-in acceleration a0 separated by the acceleration separation unit 12, and outputs the total acceleration value a3 to the integration processing operation unit 15 (step ST208).

Upon reception of the resultant, the integration processing operation unit 15 multiplies the total acceleration value a3 calculated by the acceleration addition unit 14 by an operation period Δt, adds the result to an estimated body velocity v calculated in the preceding one operation period in order to update the value of the estimated body velocity v calculated in the preceding one operation period (step ST209), and outputs the updated estimated body velocity v to the estimated body velocity output unit 16.

Note that the estimated body velocity v (an integral value) output by the integration processing operation unit 15 may deviate cumulatively from an actual body velocity due to a rounding error by the CPU or DSP, noise, and so on. An example of processing for correcting the estimated body velocity v in this case is shown on a flowchart in FIG. 3, and an outline of a corresponding processing operation is shown on a pattern diagram in FIG. 4.

Figure 3:
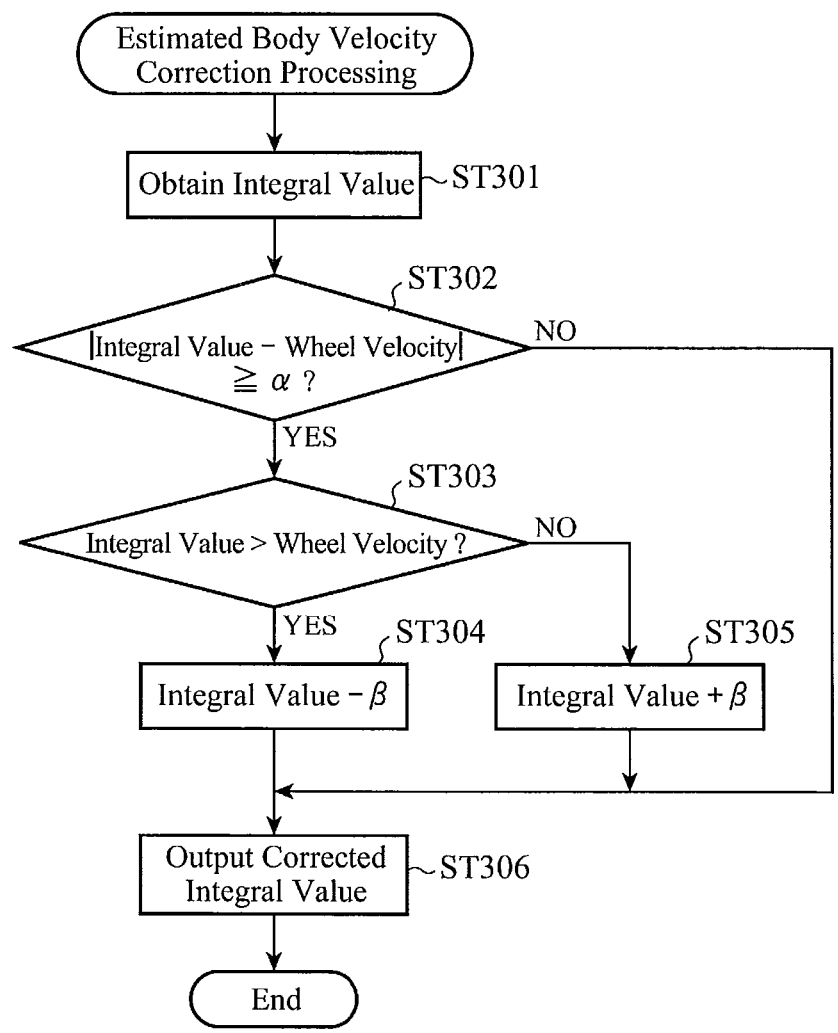
FIG. 3 is a flowchart showing an estimated body velocity correction processing operation performed by the body velocity estimating device of Embodiment 1 in the invention.

Referring to the flowchart of FIG. 3, the integration processing operation unit 15 first obtains the integral value of the acceleration, i.e. the updated estimated body velocity (step ST301), and compares an absolute value obtained by subtracting the wheel velocity output by the wheel velocity sensor from the integral value with a preset constant α including a value "0" (step ST302).

When the absolute value is larger than the constant "a" ("YES" in step ST302), the integration processing operation unit 15 compares the integral value with the wheel velocity (step ST303).

At this point, when the integral value is larger than the wheel velocity ("YES" in step ST303), the integration processing operation unit 15 subtracts a predefined constant "β" from the integral value (step ST304); similarly, when the integral value is not larger than the wheel velocity ("NO" in step ST303), the integration processing operation unit 15 adds the constant "β" to the integral value (step ST305); the corrected integral value generated at this stage is outputted to the estimated body velocity output unit 16 (step ST306).

Figure 4:
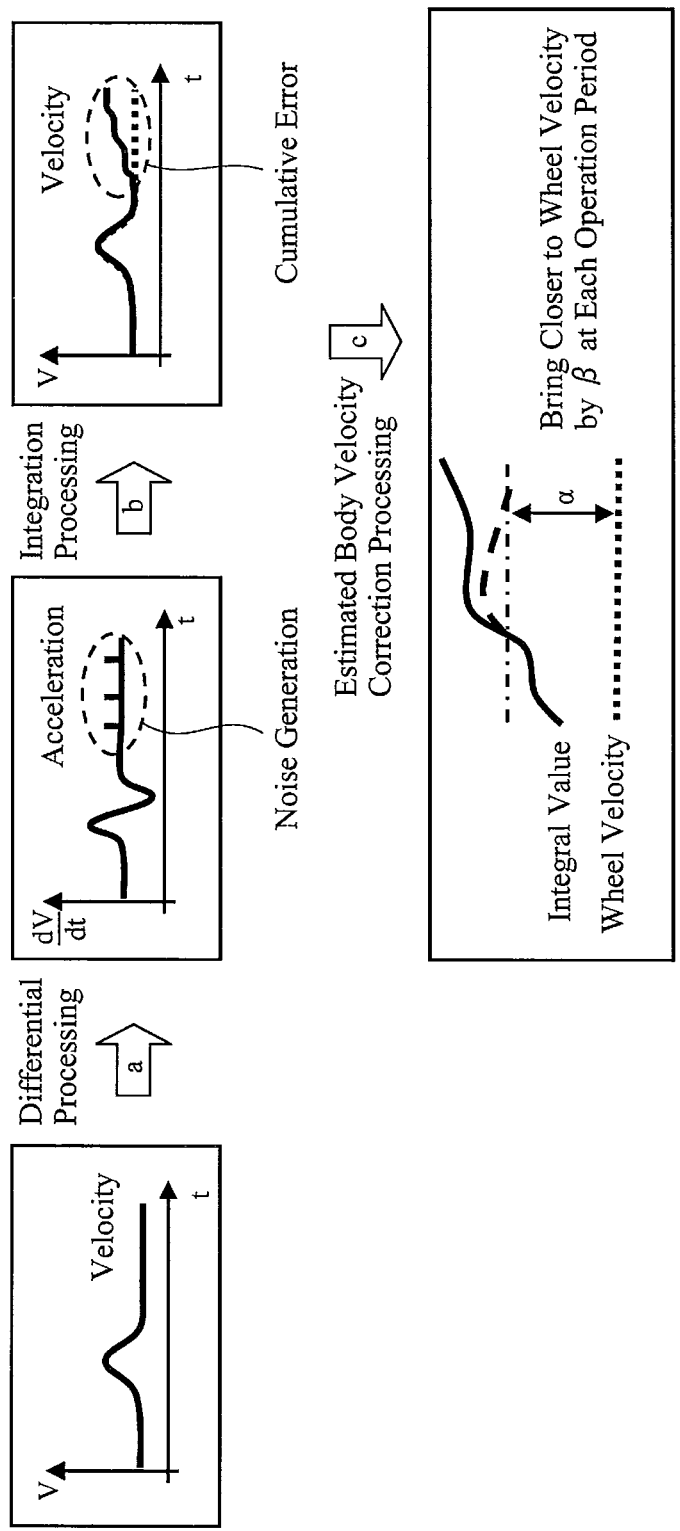
FIG. 4 is a pattern diagram showing on a graph the estimated body velocity correction processing operation performed by the body velocity estimating device of Embodiment 1 in the invention.

In other words, as shown by the pattern diagram in FIG. 4, the integration processing operation unit 15, when calculating the estimated body velocity by implementing integration processing (b) on the acceleration obtained by implementing differentiation processing (a) on the wheel velocity, executes estimated body velocity (integral value) correction processing (c) for bringing the estimated body velocity (integral value) closer to the wheel velocity by the constant "β" during each operation period in order to eliminate a cumulative error in the estimated body velocity caused by a rounding error or noise superimposed on the acceleration.

Due to this estimated body velocity (integral value) correction processing, a situation in which the integral value deviates cumulatively from the actual body velocity due to a rounding error by the CPU or DSP and noise can be prevented. Note that the values of the constants "α" and "β" are set empirically, in consideration of the level of the generated noise.

Note that when a tire locks, spins, or the like such that a reference value range-out acceleration is generated, the wheel velocity may diverge greatly from the actual body velocity, and therefore, when the estimated body velocity correction processing described above is performed to bring the integral value closer to the wheel velocity, a precision of the estimated body velocity may decrease.

Therefore, the estimated body velocity correction processing is prohibited with respect to the reference value range-out acceleration, and when the start of the estimated body velocity correction processing is delayed by setting of a timer, for example, the integration processing operation unit 15 can prevent a reduction in the calculation precision of the estimated body velocity.

The description will now be back to the flowchart of FIG. 2. The estimated body velocity output unit 16 outputs the estimated body velocity v updated by the integration processing operation unit 15 to the outside (step ST210).

As is shown in the time series shown in a box e of FIG. 1, the estimated body velocity v (solid line) output at this time is corrected relative to the wheel velocity (broken line) when spinning occurs, and a delay does not arise after the correction. Subsequently, the routine returns to the acceleration measurement processing of step ST201, whereupon the body velocity estimating processing series described above is executed repeatedly at intervals of the fixed operation period Δt.

In accordance with the body velocity estimating device of Embodiment 1 described above, the reference value range-out acceleration is added to the reference value range-in acceleration value after being subjected to filter processing, and then subjected to integration processing; thus, a divergence does not occur between the output estimated body velocity and the actual body velocity. Therefore, an overall delay does not occur during a normal run, and in the event where the measured acceleration exceeds the upper/lower limit reference value range, a rapid variation in the estimated body velocity can be suppressed.

Note that at this time, an acceleration sensor may be used for the acceleration measured by the acceleration measurement unit 11; however, here, the wheel velocity measured by the wheel velocity sensor is used, and in this case, the body velocity can be estimated without adding an acceleration sensor to the body. Needless to say, the differential value of the wheel velocity may be corrected using an output of an acceleration sensor.

Further, when the absolute value obtained by subtracting the wheel velocity from the integral value is greater than the preset constant α during the estimated body velocity (integral value) correction processing, a situation in which the integral value deviates cumulatively from the actual body velocity due to a rounding error by the CPU or DSP, noise, and so on can be prevented by bringing the integral value closer to the wheel velocity by the preset constant β. Furthermore, in the case of a reference value range-out acceleration, the value of the wheel velocity may deviate greatly from the actual body velocity due to spinning, locking, and so on of the tires, but a reduction in the calculation precision of the estimated body velocity can be prevented by delaying the start of the estimated body velocity correction processing through timer setting or the like.

Embodiment 2

Incidentally, the acceleration at which wheel spinning or locking occurs differs between a low speed run and a high speed run, tending to be greater during the low speed run and smaller during the high speed run. The body velocity estimating device 10A of Embodiment 1 discussed above, however, separates the upper/lower limit reference value-in and value-out accelerations using the preset upper and lower limit reference values Gthr1, Gthr2. In Embodiment 2 to be described below, on the other hand, the values of the upper and lower limit reference values Gthr1, Gthr2 are varied in accordance with the estimated body velocity v so that the occurrence of slipping or locking can be determined more accurately, and as a result, an improvement in the estimation precision of the body velocity can be achieved.

Hereinafter, a body velocity estimating device 10B of Embodiment 2 will be described with reference to FIGS. 5 to 7.

Figure 5:
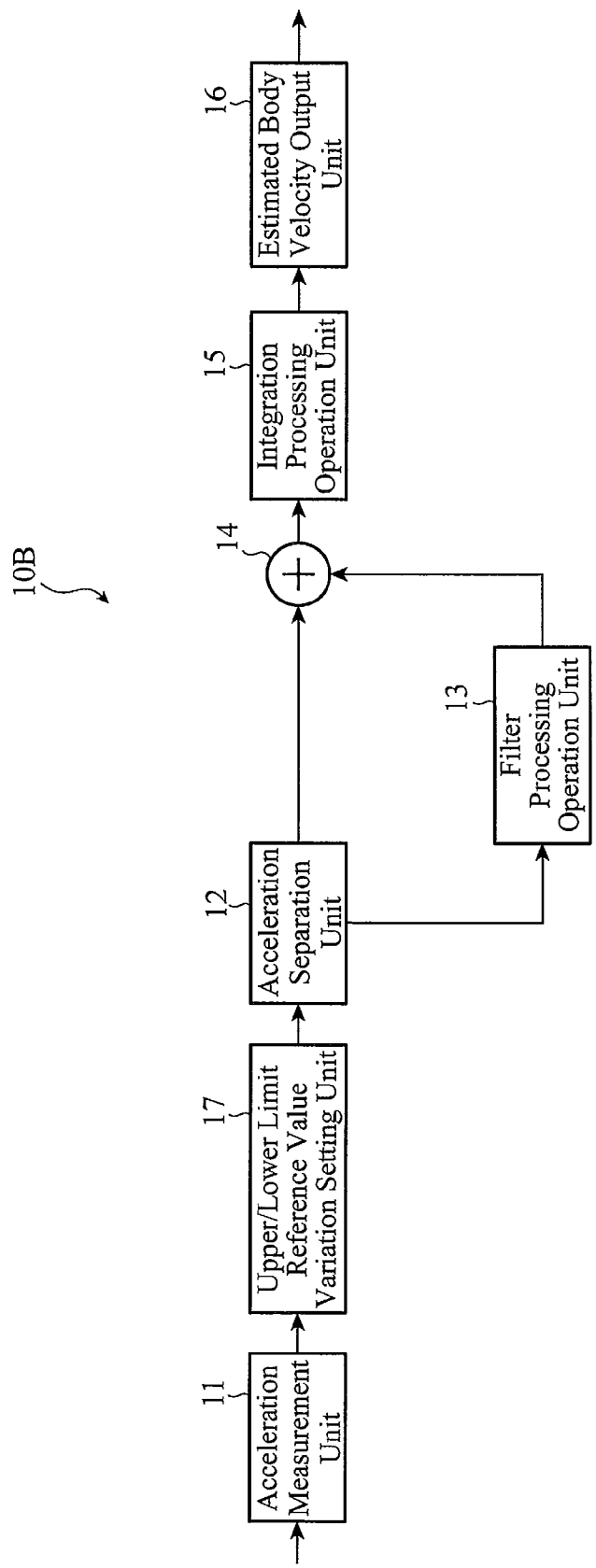
FIG. 5 is a block diagram showing the constitution of a body velocity estimating device of Embodiment 2 in the invention.

FIG. 5 is a block diagram showing the constitution of the body velocity estimating device 10B of Embodiment 2 in the invention.

The body velocity estimating device 10B of Embodiment 2 shown in FIG. 5 differs from Embodiment 1 shown in FIG. 1 in the addition of an upper/lower limit reference value variation setting unit 17 between the acceleration measurement unit 11 and the acceleration separation unit 12. The upper/lower limit reference value variation setting unit 17 has a function for varying the upper and lower limit reference values in accordance with the estimated body velocity calculated in the preceding one operation period. Other constitutions are similar to those of Embodiment 1 shown in FIG. 1. The upper/lower limit reference value variation setting unit 17 will now be described in detail using a flowchart shown in FIG. 6.

Figure 6:
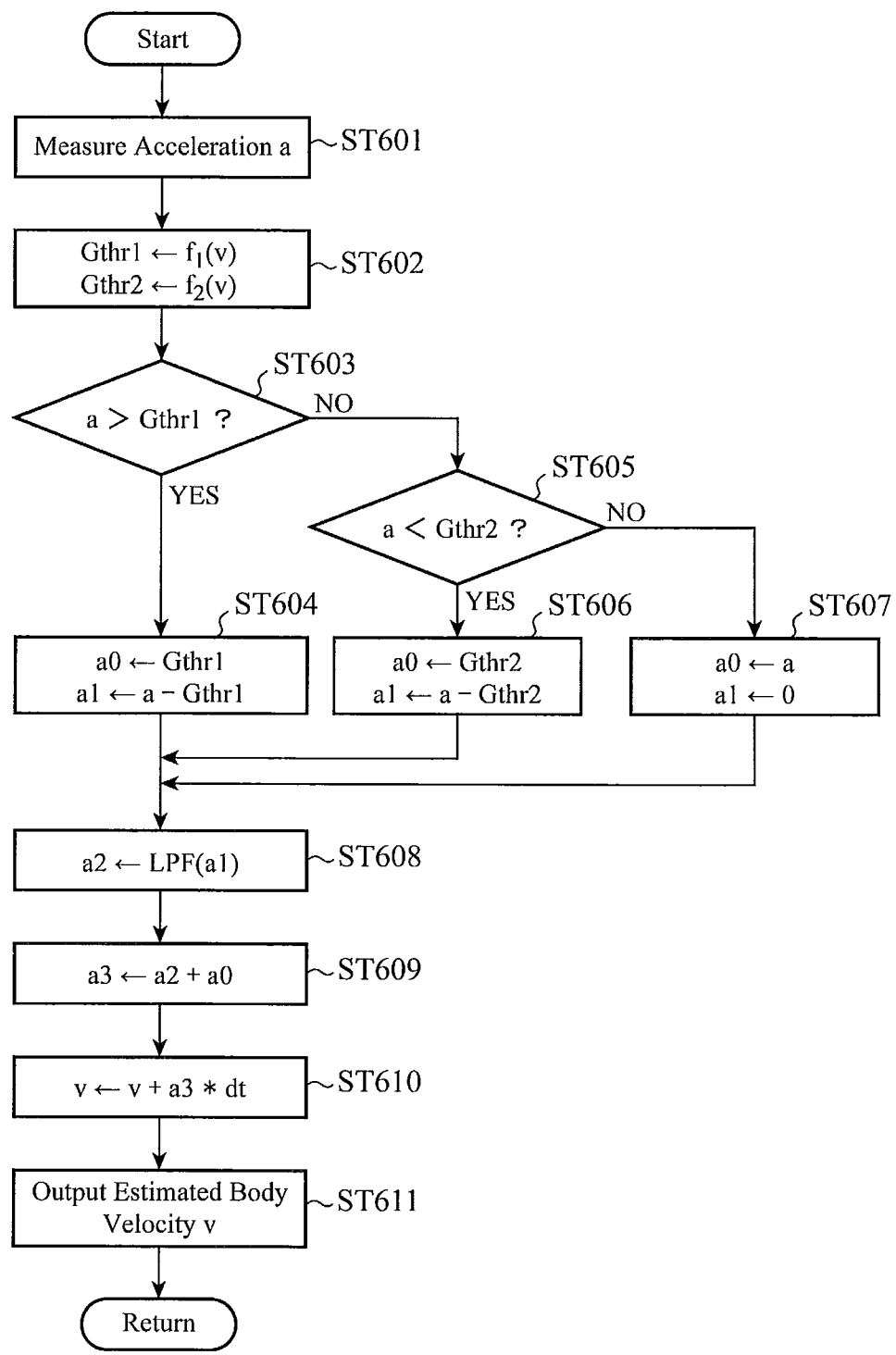
FIG. 6 is a flowchart showing an operation of the body velocity estimating device of Embodiment 2 in the invention.
Figure 7:
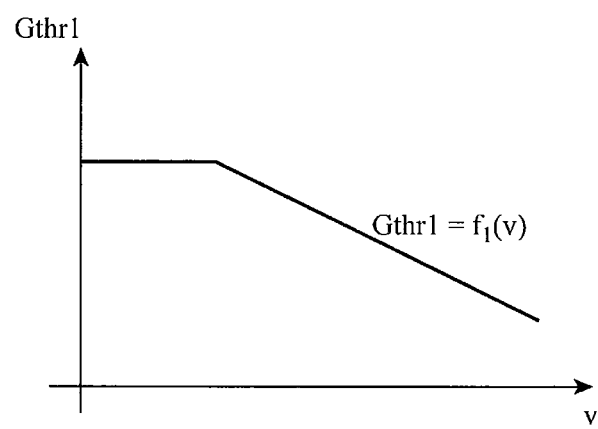
FIG. 7 is a pattern diagram showing on a graph an upper/lower limit reference value variation setting operation performed by the body velocity estimating device of Embodiment 2 in the invention.
Figure 7:
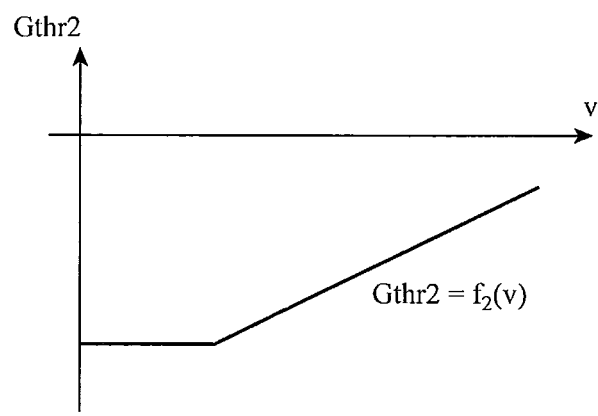

FIG. 6 is a flowchart showing an operation of the body velocity estimating device 10B of Embodiment 2 in the invention.

Hereinafter, the operation of the body velocity estimating device 10B of Embodiment 2 shown in FIG. 6 will be described in detail, focusing only on differences with the operation of Embodiment 1 shown in FIG. 2.

Referring to FIG. 6, the acceleration measurement unit 11 first measures the acceleration a by implementing differentiation processing on the output of the wheel velocity sensor, and outputs the measured acceleration a to the upper/lower limit reference value variation setting unit 17 (step ST601). Upon reception of the resultant, the upper/lower limit reference value variation setting unit 17 sets an upper limit reference value GThr1 and a lower limit reference value GThr2 dynamically with respect to the acceleration a measured by the acceleration measurement unit 11 on the basis of the estimated body velocity v calculated in the preceding one operation period (step ST602).

As a method of setting the upper limit reference value Gthr1, a function Gthr1=$f_1$ (v) shown in FIG. 7(a) may be used for the upper limit reference value Gthr1, and as a method of setting the lower limit reference value Gthr2, a function Gthr2=$f_2$ (v) shown in FIG. 7(b) may be used for the lower limit reference value Gthr2, for example.

Subsequently, the acceleration separation unit 12 compares the acceleration measured by the acceleration measurement unit 11 with the acceleration upper and lower limit reference values set by the upper/lower limit reference value variation setting unit 17 on the basis of the estimated body velocity calculated in the preceding one operation period, and separates the measured acceleration into a reference value range-in acceleration within the range of the upper and lower limit reference values and a reference value range-out acceleration outside the range of the upper and lower limit reference values (steps ST603 to ST607). Subsequent processing, in which the filter processing operation unit 13 performs filtering on the separated reference value range-out acceleration to calculate the filtered acceleration of the reference value range-out acceleration (step ST608), the acceleration addition unit 14 adds the filtered acceleration to the previously separated reference value range-in acceleration (step ST609), the integration processing operation unit 15 multiplies the added acceleration by the operation period and updates the value of the estimated body velocity by adding the resultant to the estimated body velocity calculated in the preceding one operation period (step ST610), and the estimated body velocity output unit 16 outputs the updated estimated body velocity (step ST611), is identical to that of the operation performed in Embodiment 1 shown in FIG. 2.

In accordance with the body velocity estimating device 10B of Embodiment 2 described above, acceleration generated without wheel slippage differs according to the speed at which acceleration begins, and therefore, by varying the upper and lower limit reference values in accordance with the estimated body velocity, the estimation precision of the body velocity can be improved.

For example, it can be seen from a relationship shown in FIG. 7(a) between the speed and the acceleration generated without slippage that by reducing the upper limit reference value as the estimated body velocity increases, a section in which the acceleration becomes excessive due to tire spinning can be detected earlier, thereby enhancing the precision of the estimated body velocity.

Embodiment 3

Figure 8:
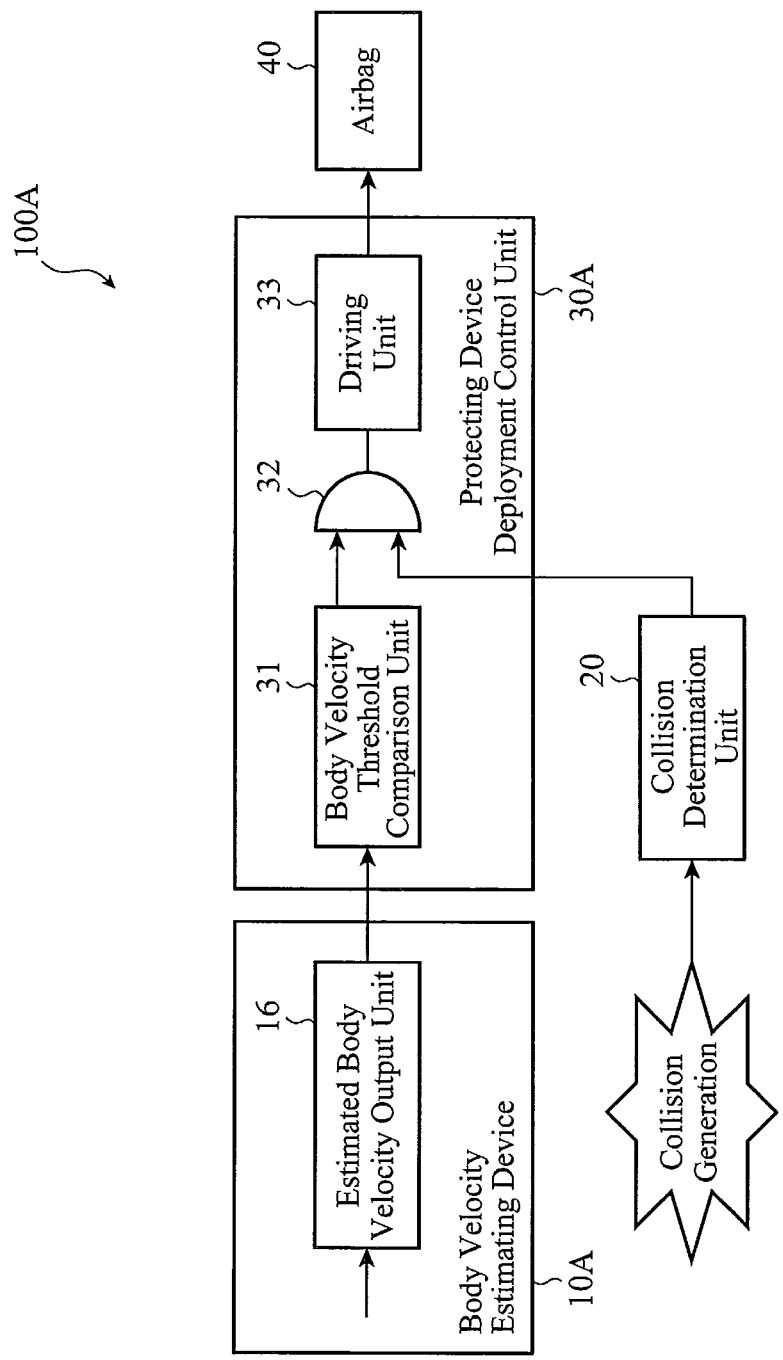
FIG. 8 is a block diagram showing the constitution of a collision safety protecting system employing a body velocity estimating device of Embodiment 3 in the invention.

FIG. 8 shows an example in which the body velocity estimating device 10A of Embodiment 1 or Embodiment 2 described above is applied to a collision safety protecting system.

Here, a passenger protecting device (an airbag) is envisaged as a collision safety protecting system 100A employing the body velocity estimating device 10A.

Referring to FIG. 8, the collision safety protecting system 100A is constituted by the body velocity estimating device 10A, a collision determination unit 20, a protecting device deployment control unit 30A, and an airbag 40.

The body velocity estimating device 10A is identical to that of Embodiment 1 described above, and therefore detailed description of the internal constitution and so on thereof has been omitted in order to avoid duplicate description. Here, only the estimated body velocity output unit 16 serving as a final output stage is shown. The collision determination unit 20 determines a collision with the body through calculation by detecting an impact on an object or a person, and outputs a determination output to the protecting device deployment control unit 30A.

The protecting device deployment control unit 30A has functions for performing a threshold determination on the estimated body velocity output from the body velocity estimating device 10A and driving the airbag 40 when the estimated body velocity is within a preset upper/lower limit driving threshold range of the airbag 40 and the collision determination unit 20 determines that driving is required. The protecting device deployment control unit 30A includes a body velocity threshold comparison unit 31, a logical AND operation unit 32, and a driving unit 33.

The body velocity threshold comparison unit 31 determines whether or not the estimated body velocity output by the estimated body velocity output unit 16 of the body velocity estimating device 10A is within the preset upper/lower limit driving threshold range of the airbag 40, and outputs a resulting output to one input terminal of the logical AND operation unit 32. A collision determination output generated by the collision determination unit 20 is input into another input terminal of the logical AND operation unit 32.

The driving unit 33 outputs an ignition signal for implementing deployment control on the airbag 40 when the estimated body velocity is within the preset upper/lower limit driving threshold range of the airbag 40 and the collision determination unit 20 determines that driving is required.

In a low velocity region (v<Vthr1), an injury value is low, and therefore a pop-up hood, including the airbag 40, does not need to be driven. Further, in certain cases when the velocity is excessive (v>Vthr2), no effect is obtained by driving the device. In the case of a pop-up hood, for example, when a pedestrian collides with a vehicle at a speed of 100 km/h or more, the pedestrian does not contact the hood of the vehicle, and therefore driving the pop-up hood has no effect. By limiting a driving range of the airbag 40 or the pop-up hood using the body velocity estimation processing described above, unnecessary driving of the airbag 40 or the pop-up hood can be prevented in such cases.

Figure 9:
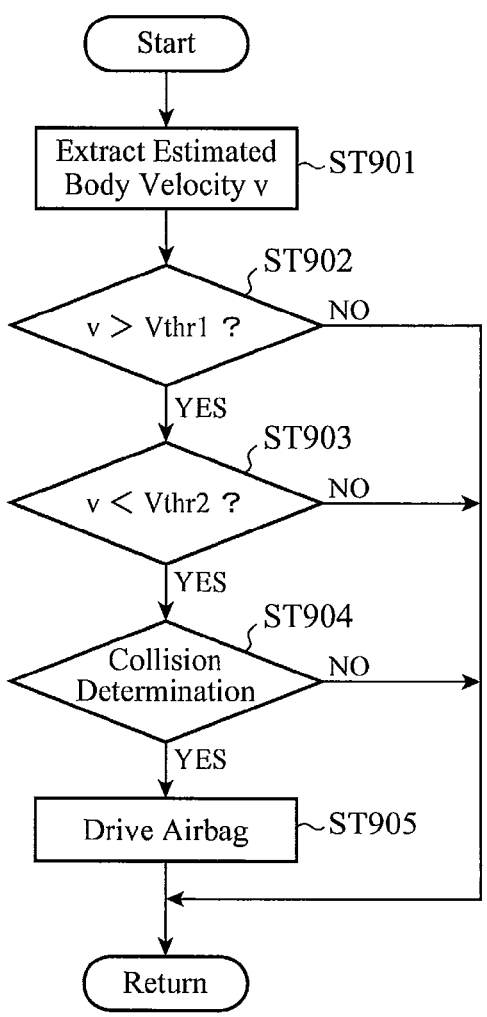
FIG. 9 is a flowchart showing an operation of the collision safety protecting system employing the body velocity estimating device of Embodiment 3 in the invention.

FIG. 9 is a flowchart showing an operation of the collision safety protecting system employing the body velocity estimating device of Embodiment 3 in the invention.

Hereinafter, an operation of the collision safety protecting system 100A employing the body velocity estimating device shown in FIG. 8 will be described in detail with reference to the flowchart shown in FIG. 9.

First, the body velocity threshold comparison unit 31 of the protecting device deployment control unit 30A extracts the estimated body velocity v generated through calculation from the estimated body velocity output unit 16 of the body velocity estimating device 10A (step ST901).

Next, the body velocity threshold comparison unit 31 determines whether or not the estimated body velocity v is within a preset upper/lower limit driving threshold range (Vthr1 and Vthr2) (steps ST902, ST903). When the estimated body velocity v is determined to be within the upper/lower limit driving threshold range Vthr1 and Vthr2 from the output of the body velocity threshold comparison unit 31 ("YES" in step ST902, "YES" in step ST903) and the collision determination output from the collision determination unit 20 indicates that driving is required ("YES" in step ST904), the logical AND operation unit 32 outputs an ignition signal to the driving unit 33 such that the airbag 40 is subjected to deployment control by the driving unit 33 (step ST905).

Note that the protection system deployment control unit 30A executes airbag deployment control using the estimated body velocity repeatedly at fixed operation period intervals.

Further, when it is determined in the body velocity upper/lower limit threshold determination of steps ST902 and ST903 that the estimated body velocity output from the body velocity estimating device 10A is not within the preset upper/lower limit driving threshold range Vthr1 to Vthr2 ("NO" in step ST902, "NO" in step ST903) or when the collision determination output generated by the collision determination unit 20 indicates that driving is not required ("NO" in step ST904), a logical AND condition of the logical AND operation unit 32 is not established, and therefore the processing series described above is terminated without implementing deployment control on the airbag 40.

In accordance with the collision safety protecting system 100A using the body velocity estimating device of Embodiment 3, described above, the estimated body velocity is used as an operation condition of the passenger protecting device or pedestrian protecting device, and therefore erroneous activation of the passenger protecting device or pedestrian protecting device can be prevented even when the wheel velocity indicates an abnormal value due to locking, spinning, or the like.

Embodiment 4

Incidentally, with the collision safety protecting system 100A using the body velocity estimating device of Embodiment 3, a reference value range-out acceleration (in other words, a case in which the acceleration value a1 is different from zero) indicates that spinning, locking, or the like may be occurring in the tires, and the behavior of the vehicle may thereby be unstable. Therefore, when the acceleration value a1 is different from zero, erroneous activation of the passenger protecting device or pedestrian protecting device can be prevented by varying the upper/lower limit driving threshold range Vthr1 to Vthr2 of the body velocity for determining the driving range.

Hereinafter, Embodiment 4 in which the collision safety protecting system 100A employs a body velocity estimating device that performs additional body velocity threshold variation setting processing will be described in detail with reference to FIGS. 10 to 12.

Figure 10:
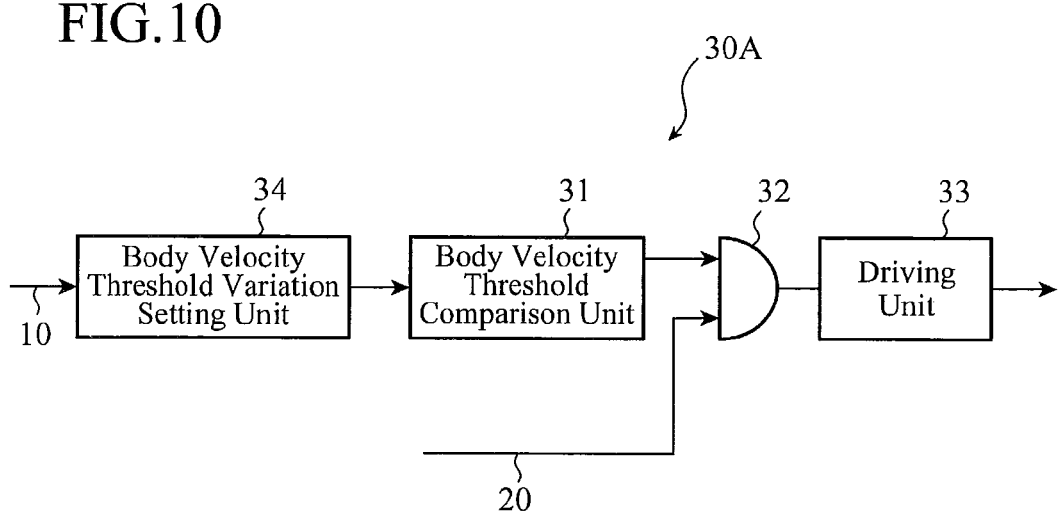
FIG. 10 is a block diagram showing the constitution of a collision safety protecting system employing a body velocity estimating device of Embodiment 4 in the invention.

FIG. 10 is a block diagram showing the constitution of a collision safety protecting system employing a body velocity estimating device of Embodiment 4 in the invention. FIG. 10 is excerpted to show only the constitution of the protecting device deployment control unit 30A.

The collision safety protecting system 100A employing the body velocity estimating device of Embodiment 4 shown in FIG. 10 differs constitutionally from Embodiment 3 shown in FIG. 8 in that a body velocity threshold variation setting unit 34 is added at an input stage of the body velocity threshold comparison unit 31. Other constitutions are similar to those of the embodiment shown in FIG. 8. The body velocity threshold variation setting unit 34 has a function for varying the aforesaid upper/lower limit driving threshold range when the body acceleration output by the body velocity estimating device 10A (the estimated body velocity output unit 16) is outside of the reference value range. This function will now be described in detail.

Figure 11:
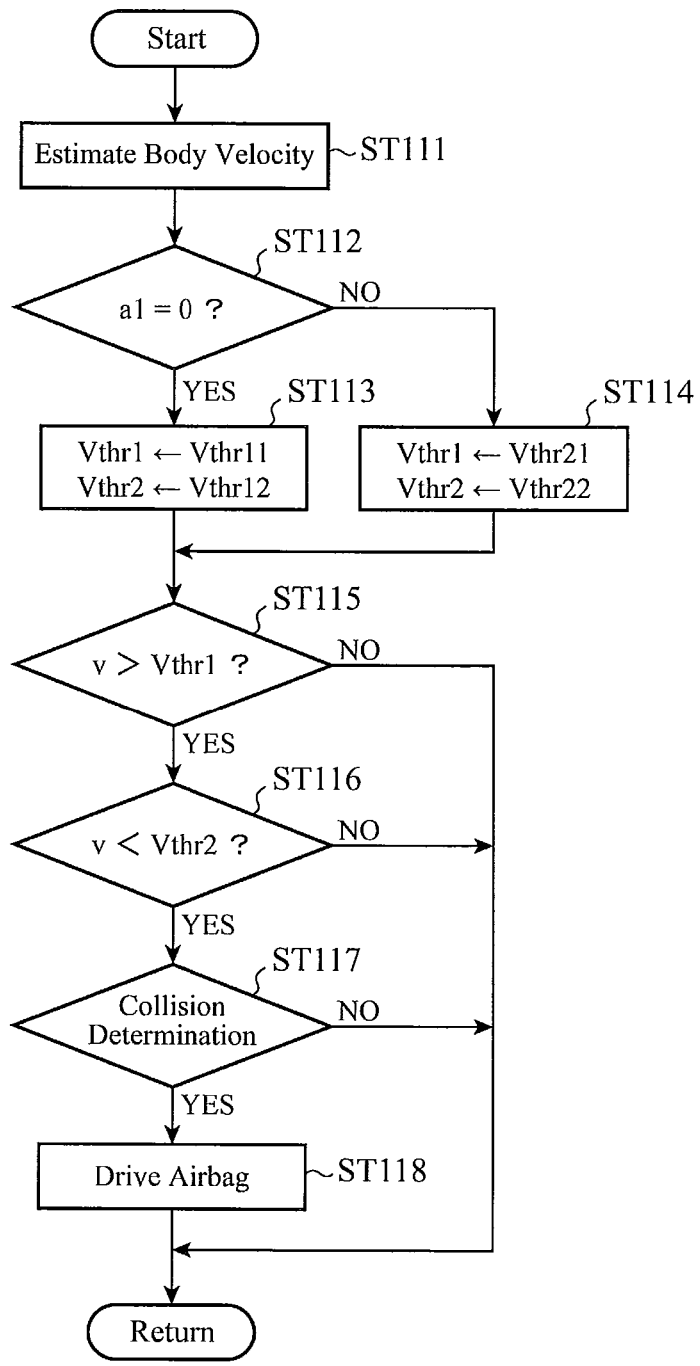
FIG. 11 is a flowchart showing an operation of the collision safety protecting system employing the body velocity estimating device of Embodiment 4 in the invention.
Figure 12:
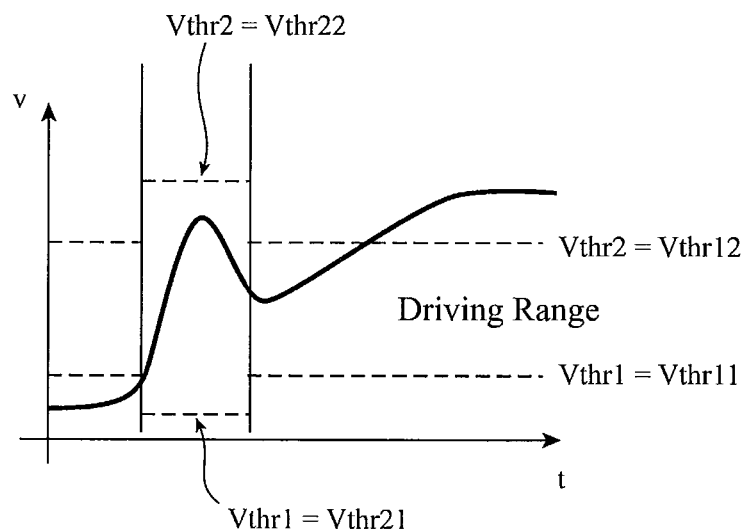
FIG. 12 is a pattern diagram showing on a graph a threshold variation setting operation performed in the collision safety protecting system employing the body velocity estimating device of Embodiment 4 in the invention.
Figure 12:
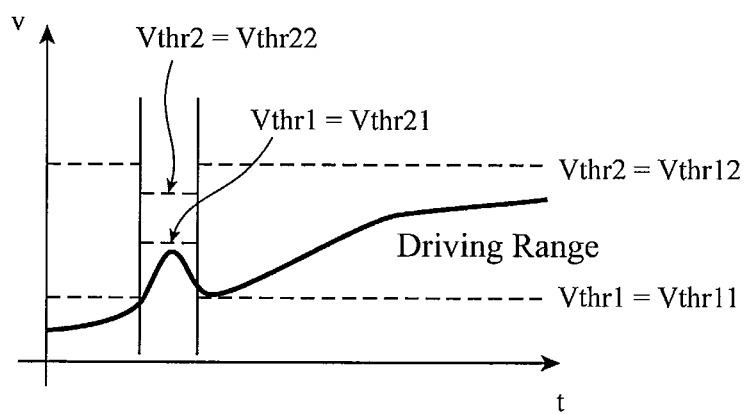
Figure 13:
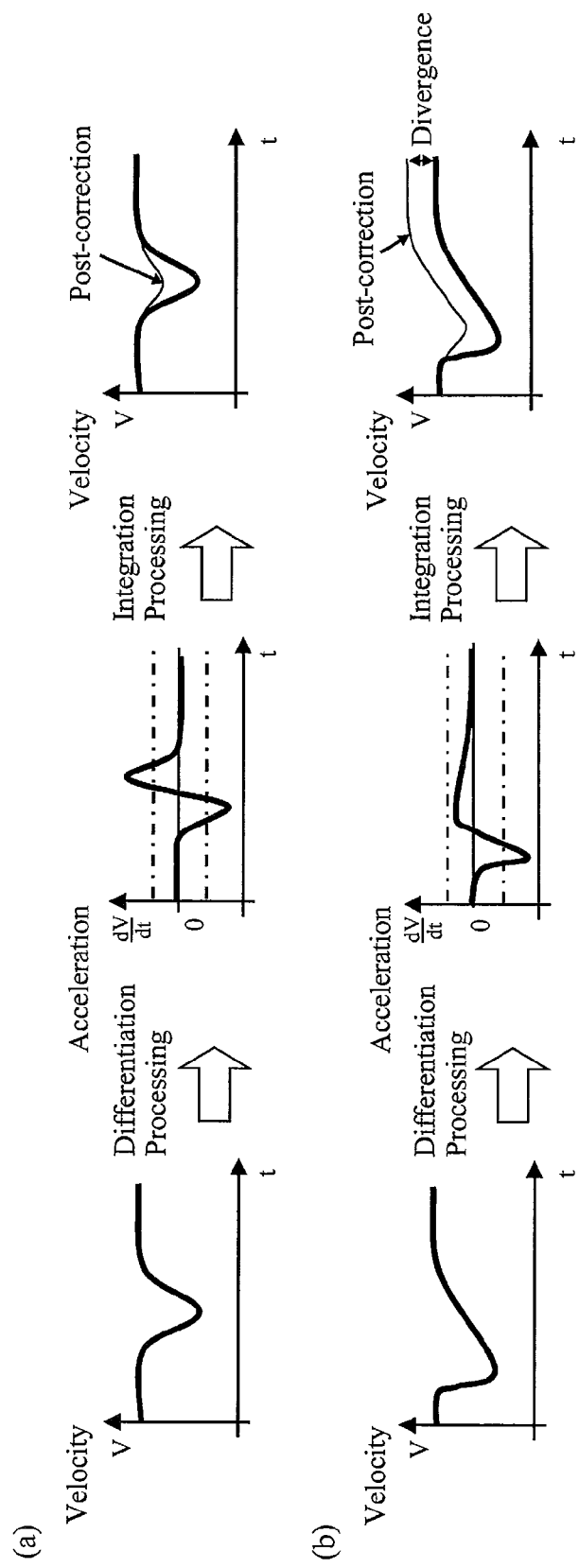
FIG. 13 is a pattern diagram showing on a graph problems that occur with a conventional body velocity estimating device that corrects an acceleration downward.
Figure 14:
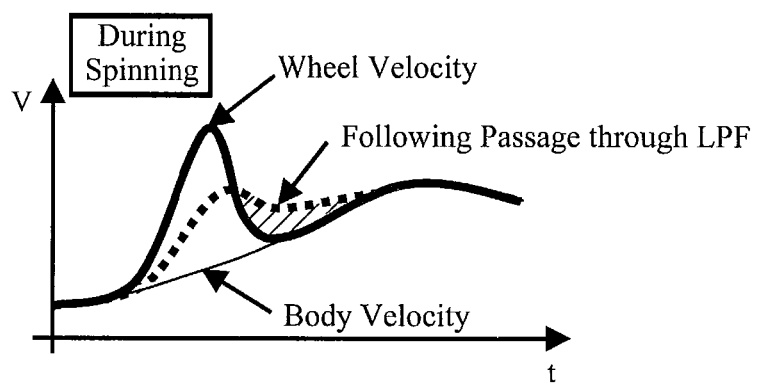
FIG. 14 is a pattern diagram showing on a graph problems that occur with a conventional body velocity estimating device when a wheel velocity varies rapidly.
Figure 15:
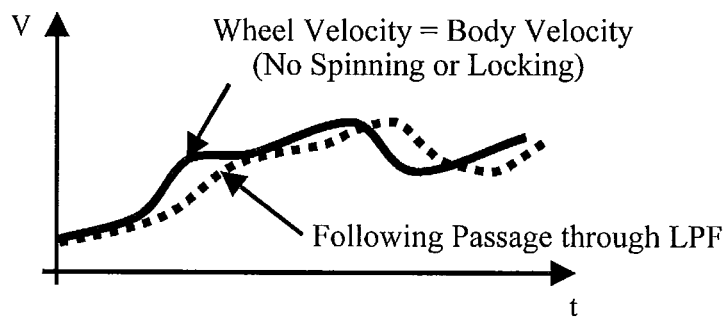
FIG. 15 is a pattern diagram showing on a graph problems that occur with a conventional body velocity estimating device during a normal run.

FIG. 11 is a flowchart showing an operation of the collision safety protecting system employing the body velocity estimating device of Embodiment 4 in the invention.

Hereinafter, an operation of the collision safety protecting system employing the body velocity estimating device shown in FIG. 10 will be described in detail with reference to the flowchart of FIG. 11.

In FIG. 11, the body velocity estimating device 10A first performs the aforesaid body velocity estimation processing (step ST111), whereupon the protecting device deployment control unit 30A extracts the estimated body velocity value. At this time, the body velocity threshold variation setting unit 34 determines whether or not the acceleration a1 output by the body velocity estimating device 10A is "0" (step ST112). When the acceleration a1 is "0" ("YES" in step ST112), the body velocity threshold variation setting unit 34 sets "Vthr11" as the lower limit driving threshold Vthr1 and "Vthr12" as the upper limit driving threshold Vthr2 (step ST113).

When the acceleration a1 is different from zero ("NO" in step ST112), on the other hand, the body velocity threshold variation setting unit 34 sets "Vthr21" as the lower limit driving threshold Vthr1 and "Vthr22" as the upper limit driving threshold Vthr2 (step ST114).

As regards the upper and lower limit driving thresholds Vthr21, Vthr22 set when the acceleration a1 is different from "0", in a case where the body behavior is unstable and the airbag 40 is set to be driven, the body velocity threshold variation setting unit 34 widens the driving range relative to the body velocity by setting the lower limit driving threshold Vthr21 to be smaller than Vthr11 and setting the upper limit driving threshold Vthr22 to be larger than Vthr12, as shown in FIG. 12(a), for example. Further, in a case where the body behavior is unstable and the airbag 40 is set to be non-driven, the body velocity threshold variation setting unit 34 narrows the driving range relative to the body velocity by setting the lower limit driving threshold Vthr21 to be larger than Vthr11 and setting the upper limit driving threshold Vthr22 to be smaller than Vthr12, as shown in FIG. 12(b), for example.

A subsequent operation for driving the airbag 40 only when the estimated body velocity is within the range of the upper and lower limit driving thresholds Vthr1 and Vthr2 and the collision determination unit 20 determines that driving is required is similar to that of Embodiment 3 shown in FIG. 9.

More specifically, the body velocity threshold comparison unit 31 determines whether or not the estimated body velocity v is within the preset upper/lower limit driving threshold range (Vthr1 and Vthr2) (step ST115, step ST116), and when the estimated body velocity v is determined to be within the upper/lower limit driving threshold range Vthr1 and Vthr2 from the output of the body velocity threshold comparison unit 31 ("YES" in step ST115, "YES" in step ST116) and the collision determination output from the collision determination unit 20 indicates that driving is required ("YES" in step ST117), the logical AND operation unit 32 outputs an ignition signal to the driving unit 33 such that the airbag 40 is subjected to deployment control by the driving unit 33 (step ST118).

In accordance with the collision safety protecting system 100A employing the body velocity estimating device of Embodiment 4 described above, when an acceleration value outside of the reference value range is generated due to spinning or locking of the tires, the body behavior may be unstable, but by varying the upper and lower limit driving thresholds in accordance with the estimated body velocity, erroneous activation of protecting devices such as the airbag 40 and the pop-up hood can be prevented.

INDUSTRIAL APPLICABILITY

As described above, to suppress variation in an estimated body velocity due to rapid variation in a body velocity and avoid a delay with respect to velocity variation during a normal run, a body velocity estimating device of the present invention, which estimates a body velocity by calculating the body velocity repeatedly at a fixed operation period and outputs the estimated body velocity, includes: an acceleration measurement unit that measures an acceleration of the body; an acceleration separation unit that compares the measured acceleration with set acceleration upper and lower limit reference values and separates the measured acceleration into a reference value range-in acceleration within a range of the upper and lower limit reference values and a reference value range-out acceleration outside the range of the upper and lower limit reference values; a filter processing operation unit that performs filtering on the separated reference value range-out acceleration to calculate a filtered acceleration of the reference value range-out acceleration; an acceleration addition unit that adds the filtered acceleration to the reference value range-in acceleration separated by the acceleration separation unit; an integration processing operation unit that multiplies the added acceleration by the operation period and updates a value of the estimated body velocity by adding the resultant to an estimated body velocity calculated in the preceding one operation period; and an estimated body velocity output unit that outputs the updated estimated body velocity. Accordingly, striking effects are obtained when the body velocity estimating device is used in a passenger protecting device such as an airbag or a pedestrian protecting device such as a pop-up hood installed in a vehicle.

The invention claimed is:
1. A body velocity estimating device that estimates a body velocity by calculating the body velocity repeatedly at intervals of a fixed operation period, and outputs the estimated body velocity, comprising:
an acceleration measurement unit that measures an acceleration of the body;
an acceleration separation unit that compares the acceleration measured by the acceleration measurement unit with set acceleration upper and lower limit reference values, and separates the measured acceleration into a reference value range-in acceleration within a range of the upper and lower limit reference values and a reference value range-out acceleration outside the range of the upper and lower limit reference values;
a low pass filter processing operation unit that performs filtering on the reference value range-out acceleration separated by the acceleration separation unit to calculate a filtered acceleration of the reference value range-out acceleration;
an acceleration addition unit that adds the filtered acceleration to the reference value range-in acceleration separated by the acceleration separation unit;
an integration processing operation unit that multiplies the acceleration added by the acceleration addition unit by the operation period, and updates a value of the estimated body velocity by adding the resultant to an estimated body velocity calculated in the preceding one operation period; and
an estimated body velocity output unit that outputs the estimated body velocity updated by the integration processing operation unit.
2. The body velocity estimating device according to claim 1, wherein the acceleration measurement unit outputs to the acceleration separation unit an acceleration obtained by implementing differentiation processing on an output of a wheel velocity sensor provided in the body.
3. The body velocity estimating device according to claim 2, wherein when an absolute value of a value obtained by subtracting a wheel velocity measured by the wheel velocity sensor from the estimated body velocity is larger than a preset first constant including zero, the integration processing operation unit performs correction processing for bringing the estimated body velocity closer to the wheel velocity by adding or subtracting a preset second constant to or from the estimated body velocity repeatedly every the operation period.
4. The body velocity estimating device according to claim 3, wherein the integration processing operation unit prohibits implementation of the estimated body velocity correction processing on the reference value range-out acceleration.
5. The body velocity estimating device according to claim 1, further comprising an upper/lower limit reference value variation setting unit that varies the upper and lower limit reference values in accordance with the estimated body velocity calculated in the preceding one operation period.
6. A collision safety protecting system that detects a collision with an object or a person and performs deployment control on a passenger protecting device or a pedestrian protecting device provided in a body, comprising:
a body velocity estimating device having an acceleration measurement unit that measures an acceleration of the body, an acceleration separation unit that compares the acceleration measured by the acceleration measurement unit with set acceleration upper and lower limit reference values and separates the measured acceleration into a reference value range-in acceleration in a region within a range of the upper and lower limit reference values and a reference value range-out acceleration in a region outside the range of the upper and lower limit reference values, a filter processing operation unit that performs filtering on the reference value range-out acceleration separated by the acceleration separation unit to calculate a filtered acceleration of the reference value range-out acceleration, an acceleration addition unit that adds the filtered acceleration to the reference value range-in acceleration separated by the acceleration separation unit, an integration processing operation unit that multiplies the acceleration added by the acceleration addition unit by the operation period and updates a value of an estimated body velocity by adding the resultant to an estimated body velocity calculated in the preceding one operation period, and an estimated body velocity output unit that outputs the estimated body velocity updated by the integration processing operation unit;

a collision determination unit that detects an impact on the object or the person and performs a collision determination on the body through calculation; and a protecting device deployment control unit that performs a threshold determination on the estimated body velocity output from the body velocity estimating device, and drives the passenger protecting device or the pedestrian protecting device when the estimated body velocity is within a preset upper/lower limit driving threshold range of the passenger protecting device or the pedestrian protecting device and the collision determination unit determines that driving is required.

7. The collision safety protecting system according to claim 6, further comprising a body velocity threshold variation setting unit that varies the upper/lower limit driving threshold range when the acceleration of the body output by the body velocity estimating device is generated in the region outside the range of the reference values.

* * * * *